July 25, 1950

G. KEINATH 2,516,217

STRIP CHART RECORDER

Filed Dec. 9, 1944

INVENTOR
*George Keinath.*
BY

July 25, 1950

G. KEINATH 2,516,217

STRIP CHART RECORDER

Filed Dec. 9, 1944

INVENTOR.
BY George Keinath.

July 25, 1950          G. KEINATH          2,516,217

STRIP CHART RECORDER

Filed Dec. 9, 1944          7 Sheets-Sheet 3

INVENTOR.
George Keinath.

SPEED RATIO 10:1 BETWEEN ADJACENT DRUMS.

Fig. 10.

INVENTOR.
George Keinath.

July 25, 1950 G. KEINATH 2,516,217
STRIP CHART RECORDER
Filed Dec. 9, 1944 7 Sheets-Sheet 5

INVENTOR.
George Keinath.
BY

July 25, 1950 — G. KEINATH — 2,516,217
STRIP CHART RECORDER
Filed Dec. 9, 1944 — 7 Sheets-Sheet 6

INVENTOR.
George Keinath.

July 25, 1950 — G. KEINATH — 2,516,217
STRIP CHART RECORDER
Filed Dec. 9, 1944 — 7 Sheets-Sheet 7

INVENTOR.
George Keinath.
BY Curt M. Avery

Patented July 25, 1950

2,516,217

UNITED STATES PATENT OFFICE 2,516,217

STRIP CHART RECORDER

George Keinath, Larchmont, N. Y.

Application December 9, 1944, Serial No. 567,356

15 Claims. (Cl. 346—33)

My invention relates to recording apparatus for measuring and supervising purposes.

It is among the objects of my invention to devise recorders which are capable of providing a plurality of strip chart records and lend themselves readily to being used for greatly diversified measuring purposes while requiring relatively simple, reliable and space-saving apparatus as compared with the recorders heretofore known for similar purposes.

Another object of the invention is to provide recording apparatus capable of producing a plurality of strip charts for recording a plurality of magnitudes of simultaneously occurring phenomena and to render such apparatus especially suitable for studying or supervising the various conditions involved in the operation of manufacturing and processing plants, and it is also an aim of my invention to provide a multiple operation recorder as just mentioned which, despite a large number of different records to be taken thereby, occupies sufficiently little space to permit designing it as an ambulatory or portable device.

An object of my invention is also to devise a recording apparatus for multiple strip chart records which contains only one pen or stylus member for producing the different records.

A further object of the invention aims at providing a recording apparatus for the supervision of industrial equipment or machines, which by means of a relatively simple mechanism, produces a record not only of the "on" and "off" periods of the equipment or machine but, within the same chart or diagram, also of an output quantity, energy consumption, or other determinant of the working condition during the "on" periods.

These and other objects of the invention will be apparent from the following description in conjunction with the appertaining drawings in which:

Fig. 18 represents a chart as obtained in a switch position recorder of the type shown in Fig. 18a;

Figures 1, 2:
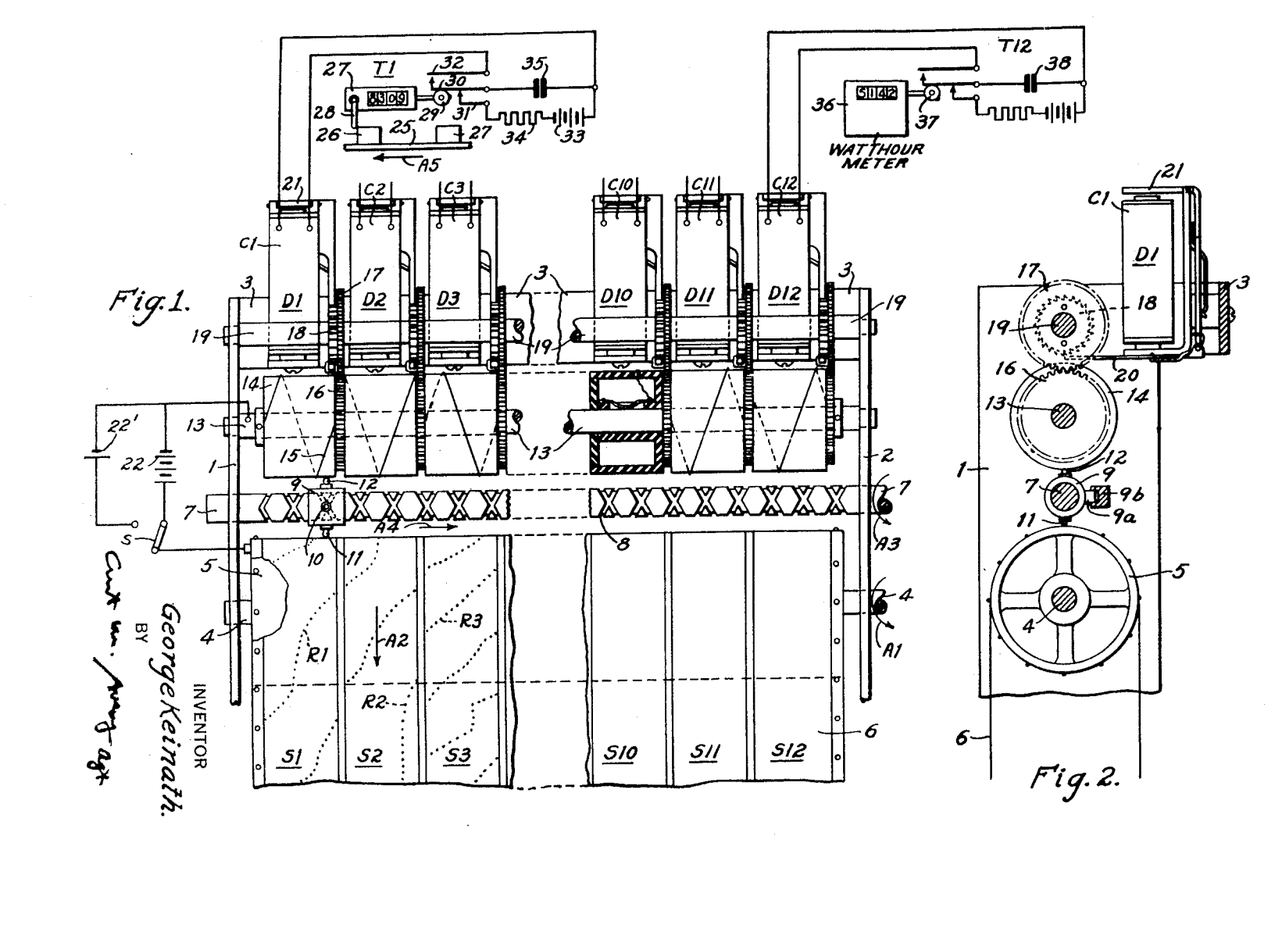
Figure 1 is a partial front view of a multiple strip chart recorder according to the invention.
Fig. 2 is a sectional side elevation of the same recorder.

Referring to Figs. 1 and 2, the frame structure of the illustrated recording apparatus has two parallel plates 1 and 2 interconnected by a cross piece 3. A shaft 4 is journalled between the plates 1 and 2 and carries a metal cylinder 5 for accommodating and advancing a recording sheet 6 which, in the illustrated embodiment, is sufficiently wide to receive twelve strip charts denoted by S1, S2, S3 . . . S10, S11, S12. When in operation, the shaft 4 is driven by a suitable motor or clockwork (not shown) so as to revolve in the direction of the arrow A1 proportional to time thereby advancing the sheet 6 in the direction denoted by the arrow A2.

A worm shaft 7, also journalled between plates 1 and 2, extends in parallel to shaft 4 and is provided with a cross-pitch thread which returns into itself near both ends of the cylinder 5. A sleeve-shaped carrier 9 is slidably mounted on shaft 7 and has a pin 10 in engagement with the thread 8. A projection 9a of carrier 9 engages a bar 9b (Fig. 2) which extends between the plates 1 and 2 and prevents the carrier 9 from rotating. Hence, when the shaft 7 revolves, the carrier 9 and its pin 10 are displaced by thread 8 along the cylinder 5. Upon reaching either end of thread 8, and without change in the revolving direction of the shaft 7, the carrier reverses its direction of travel. The shaft 7 may be driven continuously in the direction indicated by the arrow A3 by means of a suitable motor or clockwork, or by a gearing between shafts 4 and 7 (not shown). In this manner, the carrier 9 reciprocates repeatedly along the cylinder 5 during the advancing motion of the sheet 6.

The carrier 9 carries an insulating stylus or pen electrode 11 which rests resiliently against the surface of sheet 6 and is in electric connection with a control contact 12 mounted on carrier 9 opposite to electrode 11.

The sheet 6 is of the electro-responsive type so that a recording mark is produced thereon by the stylus electrode when an electric voltage is applied between this electrode and the metal cylinder 5. Such application of voltage is obtained and controlled by twelve control devices of which those visible in Fig. 1 are denoted as a whole by D1, D2, D3, D10, D11 and D12, respectively.

These control devices, in the embodiment of Figs. 1 and 2, are of similar design so that it suffices to refer in the following to details of only one of them.

A shaft 13 is firmly mounted on plates 1 and 2. Control device D1 has an insulating cylindric body or drum 14 revolvably seated on shaft 13 and held in position relative to cylinder 5 so that the axial extent of body 14 corresponds to the width of the strip chart S1. A metal wire 15 is embedded in the peripheral surface of body 14 and forms a single-turn helix whose pitch corresponds to the axial extent of body 14. A spur gear 16 is firmly secured to body 14 and meshes with a gear 17. Gear 17 is firmly attached to a ratchet 18 and revolvable about a shaft 19 which is firmly secured to the plates 1 and 2. A driving pawl 20 engages the ratchet 18 and is operated by the armature 21 of an electromagnet whose control coil is denoted by C1. Each electric current impulse applied to coil C1 causes it to advance the ratchet 18 one step thereby rotating the body 14 and its contact helix 15 a given angle.

As mentioned, the other devices, such as those denoted by D2, D3, D10, D11 and D12, are designed and operative in a similar manner so that each excitation of the respective coils C2, C3 ... C10, C11 and C12 causes a corresponding rotation of the apertaining contact helices. The control devices thus function independently of each other, each controlling the angular position of the helix allotted to one of the twelve strip charts of sheet 6.

The twelve insulating cylindric bodies (such as body 14) and the appertaining contact helices (such as helix 15) are serially aligned in proximity to one another so that control contact 12 of carrier 9 engages the bodies sequentially when travelling back and forth along the series of bodies 14. The helices 15 are all in conductive connection with shaft 13; and this shaft, in turn, is connected to a voltage source, schematically indicated at 22, whose other pole is connected to the cylinder 5, it being understood that one or both of parts 13 and 5 are insulated from the plates 1 and 2. When the carrier 9, upon leaving the left-hand end of its path travels along shaft 7, the contact pin 12 rests against the insulating surface of the cylindric body 14 of device D1 until the pin passes across the contact helix 15. At the moment of this passage the circuit of source 22 is temporarily closed, and a voltage appears between stylus 11 and cylinder 5. As a result, a dot mark is produced on the electroresponsive sheet 6 within the area of strip chart S1. As the carrier 9 passes through the range of device D2, another recording mark is produced by the stylus at the moment when contact pin 12 passes through its point of registry with the contact helix of this second device, and this second mark appears on sheet 6 within the area of strip chart S2. In the same manner, further marks are inscribed in the other strip chart areas until the carrier reaches the other end of its path. Upon reversal of its travel, the procedure is repeated in the opposite direction. Since during many reciprocations of the stylus carrier the sheet 6 advances slowly in the direction of arrow A2, a series of recording marks is produced in each of the twelve strip charts so that each strip receives a record curve of the type exemplified by curves R1, R2 and R3.

The point of registry between contact pin 12 and the contact helix of each control device depends on the rotary position of the helix and hence is shifted once through the width of the appertaining strip chart for each full rotation of the helix.

The twelve devices D1 ... D12 may be controlled independently of one another by any suitable means for transmitting impulses to the control coils C1 ... C12 in accordance with the magnitude of the respective phenomena to be studied. Two such impulse transmitters are exemplified in Fig. 1 and denoted, as a whole, by T1 and T12.

Transmitter T1 is designed as a production counter for determining the output quantity of a machine or other plant unit. A conveyor belt, advancing in the direction of the arrow A5, passes the work pieces 26, 27 from the machine or unit along a counter 28 whose register is advanced one step each time a work piece meets the actuating member 28 of the counter. A cam 29, driven by the counter, lifts and drops a movable contact 30 once for a given number of counted pieces thereby switching contact 30 from a stationary contact 31 into temporary engagement with another stationary contact 32. A current source 33, connected with a current limiting resistor 34 maintains a capacitor 35 in charged condition as long as contact 30 is dropped. When contact 30 is temporarily lifted, the capacitor 35 is disconnected from source 33 and instead connected across coil C1 of control device D1. Now a discharge current passes through the coil and causes it to advance the helix mechanism. Consequently curve R1 on strip chart S1 represents counted output versus time.

The transmitter T12 includes a meter 36 for measuring the kilowatt hour (kw. h) consumption of a machine or other plant unit under supervision. The integrating register of the meter is provided with a cam 37 which controls the charge and discharge of a capacitor 38 in a manner similar to that of transmitter T1. Transmitter T12 is connected to coil C12 of control device D12. Consequently, the contact helix of device D12 revolves one step for each given amount of power consumption, and the curve marked on the chart represents integrated values of such consumption versus time.

Figure 3:
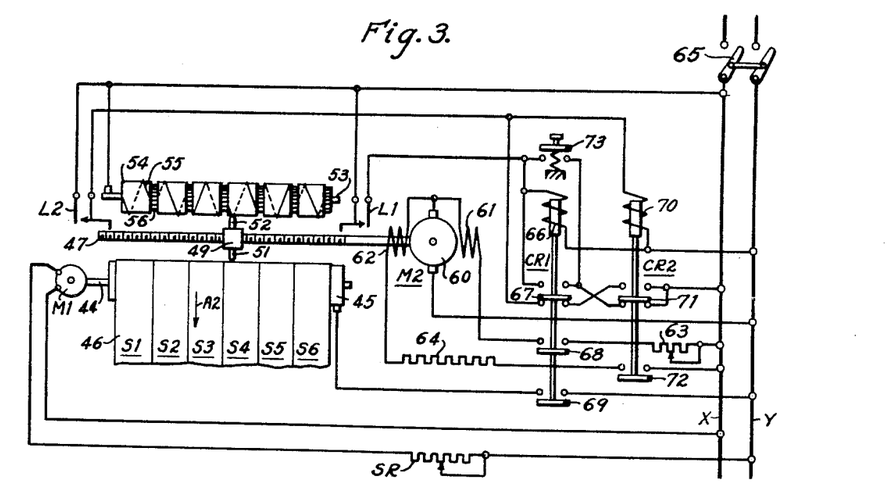
Fig. 3 shows diagrammatically another embodiment of a strip chart recorder according to the invention and represents the essential parts of the recorder mechanism in conjunction with an appertaining electric control network.

A multiple recorder as described above, operating at a substantially constant speed of the stylus transport shaft 7, produces recording marks when traveling in both directions of reciprocating motion. The marks consecutively produced on the individual strip charts S1 through S12 of sheet 6 have substantially equal spacing only in the centrally located strips, while in the border strips, such as S1 and S12, two successive record points follow each other closely and nearly a full cycle period elapses before the next two marks appear. With the total width of sheet 6 amounting to 250 mm., for instance, and with a period of 20 seconds for a full cycle of stylus reciprocation at an advancing speed of 60 mm./h. for the sheet, the virtually coinciding two record points on strip charts S1 and S12 are about ⅓ mm. apart from the next point in the advancing direction of the sheet. This spacing is satisfactory for a large variety of recording purposes. However, it is also within the scope of my invention to provide recorders, designed and operative in accordance with similar principles, which secure an equal time spacing between successive recording marks on all strip charts. It is further possible to render the stylus operative only during alternate half cycles of reciprocating motion and to perform the then idle return stroke at a higher speed than the working stroke in order to obtain an approximately uniform timing or continuity of the recording operations. The apparatus shown in Fig. 3 exemplifies the just-mentioned modifications. Fig. 3 also illustrates a simplified mechanism for driving the stylus or pen member of the recorder and shows diagrammatically an electrically operating system for controlling the operation of the recorder.

According to Fig. 3, the shaft 44 of cylinder 45 is driven by a motor M1 in proportion to time. Cylinder 45 accommodates a record sheet 46, here shown for receiving six strip charts S1 through S6, and advances the sheet in the direction of the arrow A2. In contrast to the recorder of Fig. 1, a single-thread feed screw 47 serves to move the carrier 49 with its stylus 51 and contact pin 52 along the cylinder. Six control devices similar, for instance, to device D1 in Fig. 1, are provided for controlling the marking operation of the stylus within the range of the six strip charts or width portions of sheet 46; however, only the six appertaining helix drums are shown in Fig. 2. These six drums are loosely aligned on a common shaft 53 and have each an insulating cylindric body 54 with a single-turn contact helix 55 and a transmission gear 56, these parts being similar to those denoted in Fig. 1 by 14, 15 and 16, respectively. The three shafts 44, 47 and 53 are mounted on a supporting structure (not shown in Fig. 2).

The feed screw 47, in order to reciprocate the stylus carrier, must alternately be revolved in opposite directions. To this end, the screw is connected to the armature 60 of a reversible electric motor M2 whose field windings 61 and 62, wound for opposite rotation of the armature, are alternately energized under control by two limit switches L1 and L2 with two appertaining control relays CR1 and CR2 respectively. Winding 61, when energized, causes the armature 60 to move the stylus carrier 49 in the working direction at a speed selected by means of an adjusting rheostat 63. Winding 62, when energized, causes the carrier to perform its return stroke. A field weakening resistor 64 is provided to obtain an increased speed of return motion thus reducing the duration of the idle stroke to a minimum. The motor M2 and the appertaining resistors are connected to the mains X and Y of a current supply line controlled by a main switch 65. The connection extends through main contacts of the two relays CR1 and CR2, still to be described. The same mains may also serve to feed the sheet transport motor M1, preferably through a speed adjusting rheostat SR.

The two limit switches L1 and L2 have each a movable contact located in the path of the stylus carrier near the ends of this path. The movable contact is normally biased toward open position but when entrained by the stylus carrier engages a stationary contact thus closing temporarily an energizing circuit for either relay CR1 or CR2.

Relay CR1 has its operating coil 66 connected between main Y and limit switch L1, the latter being in turn connected to main X. Three contacts 67, 68 and 69 are controlled by coil 66. Relay CR2 has its coil 70 connected between mains X and Y through limit switch L2 and is equipped with two contacts 71 and 72. A push button contact 73, biased to normally open position, permits energizing the coil 66 of relay CR1 in order to start the operation in a manner to be explained hereinafter.

The marking operation of stylus 51 is electric as in the embodiment of Fig. 1. The marking circuit extends from main X, through shaft 53 to each of the contact helices 55, thence through control pin 52, as the pin travels across each helix, to stylus 51, through the electro-responsive sheet 6 and cylinder 45 to contact 69 of relay CR1, and main Y. This circuit is closed at contact 69 only when relay CR1 has picked up. Contact 68 of the same relay controls motor winding 61 for moving the stylus relatively slowly along its working stroke. Consequently, the stylus performs its marking operation only during this working stroke and runs idle when passing rapidly through its return stroke.

The operation of the recorder as a whole is as follows: closure of switch 65 places the apparatus in working condition, but when stylus carrier 49 assumes a position, as shown in Fig. 2, between limit switches L1 and L2, the coils 66 and 70 of both relays CR1 and CR2 are deenergized and the motor M2 remains at rest while the sheet transport motor M1 starts operating. When now the start button 73 is depressed, a circuit is closed from main X, through contact 71, button 73, coil 66, to main Y. Relay CR1 picks up and closes at contact 67 a self holding circuit through contact 71. Therefore, relay CR1 remains energized after button 73 is released. Contact 68 puts voltage on motor winding 61 so that armature 60 starts driving the stylus carrier in its working direction toward limit switch L2; and contact 69 closes the marking circuit so that the stylus is operative to produce a series of record points on sheet 6 as described in the foregoing. At the end of the working stroke, carrier 49 closes the limit switch L2. Now coil 70 becomes energized and relay CR2 picks up thereby opening at contact 71 the self sealing circuit of relay CR1. Consequently, relay CR1 drops off and, at contact 67, closes a self sealing circuit for coil 70 of relay CR2. Thus, relay CR2 remains energized in circuit X, 71, 67, 70, Y after limit switch L2 is subsequently opened. In this manner, motor winding 60 is deenergized and the marking circuit interrupted, while motor winding 62 is energized and causes the stylus carrier 9 to run rapidly and electrically idle toward limit switch L1. When carrier 9 hits upon the switch, coil 66 of relay CR1 is again energized. Contact 67 opens the self-sealing circuit of relay CR2 and prepares a self-sealing circuit for relay CR1 which, immediately afterward, is completed at contact 71 of dropped-off relay CR2. As a result, the motor M2 is reversed and another working stroke started. This performance repeats itself until the main switch 65 is opened. The time constants of the relay operation can be so chosen, if desired, that both motor windings 61 and 62 are simultaneously energized for a short interval during each reversing operation in order to brake the motor by plugging. However, other automatic braking means may be employed instead. One or both of the limit switches L1 and L2 according to Fig. 3 may be made displaceable along the path of travel of the stylus carrier 9. This permits selecting one strip chart or any number, less than the available total, of consecutive strip charts and helix drums to be scanned by the stylus assembly. In this manner, when only one or a few strip chart sections of the multiple recorder are to be used, the stylus may be caused to travel only across the one or several selected strip charts and to reverse its motion as soon as the scanning of the selected helix drums is completed. This affords not only a reduction in the time needed for each complete sweep motion of the stylus but contributes also to better continuity of the marking operation performed by the stylus.

Reverting to Fig. 1, it will be noted that the electromagnetic drives of the control devices D1 . . . D12 and the appertaining measuring devices exemplified by impulse transmitters T1 and T12, are designed for counting or integrating measurements. However, it is one of the characteristics of my invention that the adjustment of the devices for controlling the marking operation of the pen or stylus is not limited to a particular type of control but can be performed in response to any phenomenon capable of being translated into and measured by, a corresponding mechanical motion regardless of whether this motion is obtained by a direct deflection method or some follow-up or other indirect method. This will be understood from the following description of the embodiments of my invention shown in Figs. 4 through 8.

Figure 4:
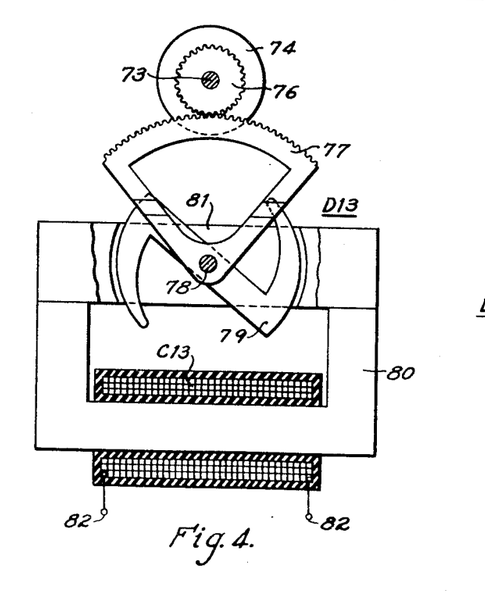
Figs. 4 and 5 illustrate by a side elevation and front elevation, respectively, a control device applicable as part of a recorder otherwise designed as shown in Figs. 1, 3, 6, 7 or 8.
Figure 5:
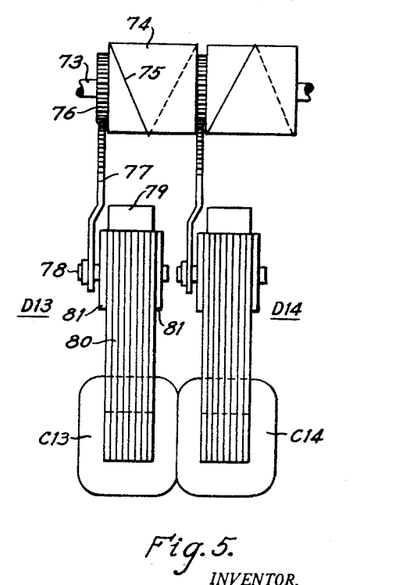

Figs. 4 and 5 illustrate a control device, denoted as a whole by D13 and shown in Fig. 5 together with an adjacent control device D14 of duplicate design, which permits recording deflection measurements and is intended to be inserted in a recording apparatus of the type shown in Fig. 1 or 2 instead of any of the devices D1 . . . D12 previously described. That is, the insulating cylinder or drum 74 with its contact helix 75 and spur gear 76 is revolvably seated on a shaft 73 and corresponds, for instance, to cylinder 14 in Figs. 1 and 2. A sector gear 77 meshes with spur gear 76 and is mounted on the shaft 78 of an armature 79 disposed between the pole faces of an electromagnet 80. Shaft 78 is journalled between two non-magnetic plates 81. If the helix 75 is designed for 360° revolution (full-turn helix), a total rotation of the armature of about 80° may conveniently be chosen for this type drive. The terminals 82 of the magnet coil C13 are to be connected to a measuring circuit for supplying a direct current whose magnitude changes in accordance with the condition to be measured. A spring (not shown) is provided for biasing the armature assembly toward a position of rest so that the helix assumes a position of revolution determined by the ampere value of the current supplied through terminals 82 to coil C13 (or C14). Hence, the stylus, when passing through the position of registry with the helix, will produce a mark on the appertaining strip chart in a position indicative of the measured magnitude to be recorded.

Figure 6:
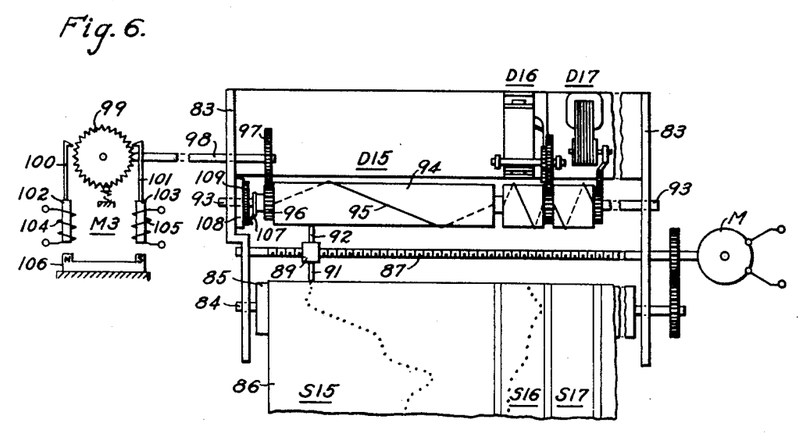
Fig. 6 is a schematic illustration of a further embodiment according to my invention.
Figure 7:
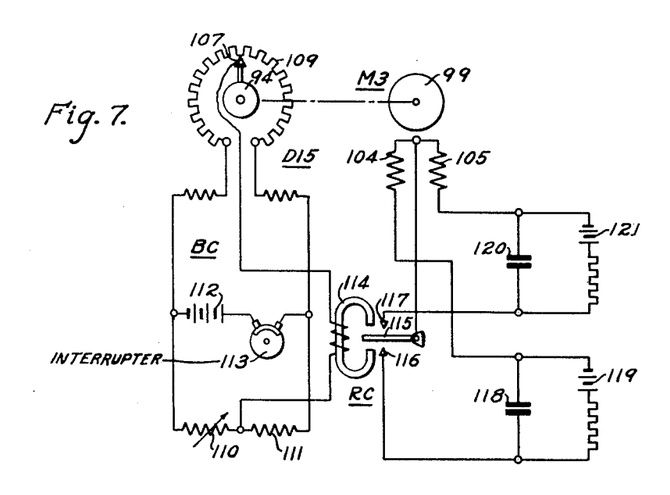
Fig. 7 represents the electric circuit diagram appertaining to the apparatus of Fig. 6.

While the control device of Figs. 4 and 5 will be recognized as operating according to a direct deflection method, one of the control devices of the recorder shown in Figs. 6 and 7 involves a follow-up method as regards the adjustment of the helix drum.

Referring to Fig. 6, the frame structure 83 of a multiple recording apparatus carries the revolvable shaft 84 of a cylinder 85 for accommodating a recording sheet 86 and also the revolvable feed screw 87 for driving the carrier 89 of a stylus 91 and a contact pin 92. Shafts 87 and 84 are driven by a constant speed motor M which may be controlled in the manner exemplified above in conjunction with Fig. 3. Another shaft 93 (Fig. 6) is firmly mounted on frame 83 and carries the helix drums of a number of devices, such as those located at D15 and D16, for controlling the marking operation of the stylus in the manner described previously. The two strip charts of sheet 86 that are correlated to devices D15 and D16 are denoted by S15 and S16 respectively. The drive mechanism of device D16, for instance, may be similar to any of those described previously. In distinction therefrom, device D15 includes a follow-up system designed as follows.

The drum 94, revolvable about shaft 93 and provided with a contact helix 95 and a spur gear 96, is driven by a gear 97 whose shaft 98 is connected to a reversible motor or driving unit M3. While it should be understood that the follow-up drive for the helix drum may be equipped with any suitable motor or drive mechanism of the reversible type, the drive unit M3 shown in Fig. 6 is designed, in accordance with a novel principle of my invention, to operate intermittently and stepwise. In the illustrated embodiment that is achieved by means of a ratchet gear 99 which is mounted on the drive shaft 98 and under control by two oppositely acting pawl members 100 and 101, each having a magnetic armature 102 or 103 to be magnetized by a field coil 104 or 105. The magnetic circuit of the armatures is preferably polarized by means of a permanent magnet 106. The energization of the coils 104 and 105 is controlled by an electric system (Fig. 7) which includes an adjustable potentiometric rheostat whose slide contact 107 (Figs. 6 and 7) is firmly attached to the helix drum 94 so as to rotate together therewith. The rheostat has a stationary insulating base 108 (Fig. 6) secured to frame 83 which carries the appertaining potentiometric resistor 109 (Fig. 7).

The control system, as shown in Fig. 7, is composed of a Wheatstone bridge circuit BC and a relay circuit RC. Bridge circuit BC includes an impedance member 110 which varies its impedance value in response to changes of a condition under observation and, hence, represents the measuring gauge proper of the system. Another impedance member 111 in circuit BC serves as a standard of comparison. Members 110 and 111 are arranged in a closed series connection with resistor 109. The input diagonal across this connection contains a constant voltage source 112, and an interrupter 113 here shown as a rotary contact device. The output or zero diagonal of circuit BC, extending from slider 107 to a point between members 110 and 111, includes a polarized electromagnetic relay 114. The movable contact 115 and two appertaining stationary contacts 116 and 117 of relay 114 are connected to coils 104 and 105 of the reversible drive M3. A parallel group of a capacitor 118 and a direct current source 119 lies between contact 116 and coil 104. A similar group, containing a capacitor 120 and a parallel connected current source 121, is connected between contact 117 and coil 105. When relay contact 115 is in the illustrated center position, the circuits of both coils 104 and 105 are open and the two condensers 118 and 120 are charged by their respective current sources 119 and 121.

During the operation of the system, the interrupter 113 is rotating and energizes circuit BC in regular intervals, for instance, every second for a period of half a second, these intervals and periods being chosen, in accordance with the requirements or desiderata of the intended application. With no current flowing in circuit BC, relay member 115 is in center position. If circuit BC is balanced when the interrupter 113 closes, the voltage across the relay diagonal remains zero so that member 115 retains the center position. When the bridge is unbalanced at the closure time of interrupter 113, an unbalance voltage appears across the coil of relay 114 and causes contact member 115 to engage either contact 116 or 117 depending upon the direction of the unbalance. This, in turn, causes capacitor 118 or 119 to discharge through coil 104 or 105, thereby actuating one of the two pawls 100, 101 (See Fig. 6) with the effect of turning the ratchet wheel 99 and the helix drum 85 one step in the direction required for reestablishing the balance condition of circuit BC. When the unbalance persists at the next closure of interrupter 113, the drive M3 moves the helix drum another step toward the balance adjustment, and when the direction of unbalance changes the same operation comes into play except that it will then occur in the opposite direction.

A follow-up system of the intermittently and step-wise operating type as exemplified by the above-described apparatus of Figs. 6 and 7 is advantageous in cases where a low current consumption and/or a reduced switching duty of the relay are desired. Since the current in the bridge circuit flows intermittently and each time for a limited period only, the consumption is correspondingly low and an overheating of the gauge element 110, consisting for instance of a resistance thermometer, is prevented even if the bridge current is so heavy that it would cause overloading if it flowed continuously. Excessive wear of the relay contacts is avoided because, upon each contact closure, the discharge current of the capacitors builds up gradually, due to the high inductivity of the field coils 104 and 105, thus reducing the switching duty imposed on the relay contacts. In addition, the illustrated provision of a polarized electromagnetic ratchet drive reduces the energy requirements for the relay circuit as compared with the use of ordinary unpolarized drives or power relays with two relay systems. These advantages are especially valuble for portable or ambulatory recording apparatus to be energized from dry cells or storage batteries.

Figure 8:
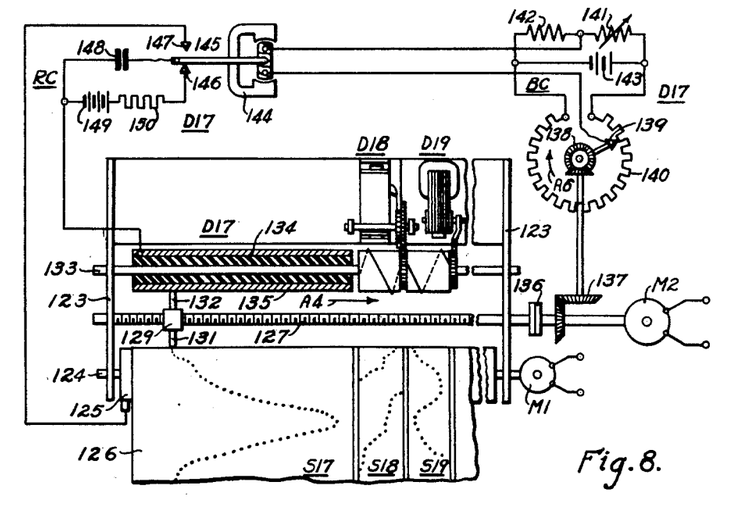
Figs. 8, 9 and 10 are diagrammatic showings of three further modifications, respectively, of recording apparatus according to the invention.

A control device also applicable in apparatus according to the invention but operating in a manner different from that of the above-described helix drums, is embodied in the multiple recorder shown in Fig. 8 where several component portions of the device are denoted by D17. According to Fig. 8, the supporting frame structure 123 of the recorder has bearings for the shaft 124 of the cylinder 125 for accommodating the recording sheet 126. Shaft 124 is connected to a motor M1 to be driven in proportion to time. The sheet is wide enough to accommodate a plurality of strip charts such as those denoted by S17, S18 and S19. A threaded shaft 127, driven by a motor M2, for instance in the manner and by the control means described above in conjunction with Fig. 3, engages with its threaded portion a carrier 129. A stylus electrode 131 and a control contact or pin are mounted on the carrier 132. Another shaft 133, stationarily mounted on the supporting structure 123 of the apparatus, extends in parallel to shafts 124 and 127 and serves as a seat for a number of helix drums appertaining to control devices of the two types shown in Figs. 1, 2 and 4, 5. The device denoted in Fig. 8 by D18 has a step-by-step drive corresponding to the devices shown in Figs. 1 and 2 and serves to control the marking operation of the stylus along the width portion (strip chart) S18 of sheet 126. The control device D19 shown in Fig. 8 corresponds to those of Figs. 4 and 5 and serves to control the marking operation for strip chart S19. Devices D18 and D19, together with any desired combination of additional devices of either type, are secured to the supporting frame 123 of the recorder.

The control device D17 is provided for controlling the marking operation of the stylus when it traverses the width portion of sheet 126 occupied by strip chart S17. An insulating cylindric body 134, forming part of device D17, is mounted on shaft 133 and carries a metal sleeve 135 of the same diameter as the contact helices of the other control devices D18, D19. However, cylinder 134 need not be revolvable and, preferably, is firmly seated on shaft 133. While the stylus 131, during its marking stroke, travels across chart S17, the contact pin 132 of stylus carrier 129 is in sliding contact with the stationary sleeve 135. However, the marking circuit of which sleeve 135 forms part, is so controlled that it is energized only when the stylus passes through a point of travel indicative of the measured magnitude to be recorded. The means, appertaining to device D17, for achieving this controlled energization of the marking circuit will be described presently.

A coupling 136 connects the stylus feed shaft 127, through bevel gears 137 and 138, with the rotatable slider 139 of a potentiometer rheostat 140 which forms part of a Wheatstone bridge circuit BC containing a condition-responsive impedance member or measuring gauge 141 and a standard impedance member 142. The bridge circuit is energized from a current source 143 and has its output diagonal or zero branch connected to the moving coil of a galvanometric relay 144. The movable contact 145 of relay 144 cooperates with two stationary contacts 146 and 147 to charge a capacitor 148 from a current source 149 through a current limiting resistor 150 when contact 145 rests against contact 146, and to discharge the capacitor 148 through sleeve 135, contact pin 132, stylus electrode 131, paper sheet 126, and sheet transport cylinder 125 as soon as contact 145 has switched over to contact 147.

When the stylus carrier 129 begins its working stroke in the direction of the arrow A4, the slider 139 starts simultaneously its rotary travel along rheostat 140 in the direction of the arrow A6. Stylus carrier and slider move in synchronism, and slider 139 completes a full cycle of its rotation at the moment when contact pin 132 reaches the end of sleeve 135. At the beginning of this operation, the bridge circuit is unbalanced so that contacts 145 and 147 are separated. Consequently, the marking circuit is interrupted so that the moving stylus 131 is inoperative electrically. During its further travel, slider 139 passes through an angular position in which the impedance magnitude of measuring gauge 141 is balanced by that of the standard impedance member 142. In this instant, the voltage across the zero branch passes through zero and reverses its polarity. This causes relay 144 to switch movable contact 145 from contact 146 to contact 147. As a result, the capacitor, previously charged through contact 146, is discharged through stylus electrode 131 and sheet 126. The discharge produces a recording mark on the sheet and exhausts itself so rapidly that the mark forms a point whose location, relative to the width of strip chart S17, indicates the instantaneous position of the stylus at the moment of bridge balance and, hence, is representative of the corresponding angular position of the slider 139. Since the slider position depends on the impedance value of gauge 141, the recorded mark is indicative of that value and thus of the magnitude of the condition measured by the gauge. The curve produced in this manner on sheet 126 by a succession of marks placed on strip chart S17 represents the variations of the measured magnitude versus time.

When the contact pin 132, advancing in the direction of arrow A4, leaves the sleeve 135 and enters into engagement with the helix drum of control device D18, the marking circuit of device D17 is interrupted so that the further operation of the rheostat and relay arrangement is ineffective to produce recording marks during the rest of the stylus travel. Then, however, the successive engagement of the advancing contact pin 132 with the helices of devices D18, D19, etc. is effective to temporarily close another marking circuit between the helices or their common shaft 133 and the sheet transport cylinder 125, as explained previously. It is, of course, possible to release the coupling 136 during the periods in which the control device D17 is to remain inoperative, for instance by means of an automatic control governed by suitably arranged limit switches of the type mentioned above in conjunction with Fig. 3 (such details being not shown in Fig. 8). It should also be understood that I consider the control rheostat and relay means of device D17, as described above, to be representative of a large variety of different control systems of similar cyclical operation, such as those disclosed in my Patents Nos. 2,321,605 and 2,340,880.

The contact sleeve 135 in Fig. 8 functions as a backing member or slide path for the control contact pin 132. The use of a sleeve placed on an insulating cylinder, as illustrated, has the advantage that the member can readily be placed on a common shaft with the backing members or helix drums of the other control devices and secures a proper alignment of its slide path with those of these other members without requiring a critical angular adjustment. If desired, however, the device D17 may be equipped with a backing member of different design, the only requirement being that it has a conductive and insulated slide path of proper length and location to be engaged by the control contact 132 as it travels across the corresponding strip chart of the recording sheet.

For the sake of simplicity and because I consider the use of electroresponsive record sheets recommendable in conjunction with my invention, only the method of marking by electric discharge is referred to in the foregoing. However, other electric or non-electric marking methods may likewise be used for recorders according to the invention. For instance, it is possible to equip the recorders with a stylus of any suitable kind which is normally held away from the sheet and is forced electromagnetically or mechanically against the sheet at the points of stylus travel where a mark is to be recorded. This will be understood from the modification shown in Fig. 9 and described presently.

Figure 9:
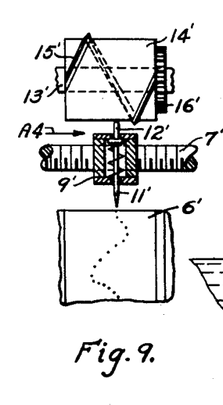

The details shown in Fig. 9 are applicable instead of the corresponding parts in recording apparatus otherwise designed in accordance with Figs. 1 and 2. Therefore, the reference numerals applied to Fig. 9 are the same as those of comparable parts of Figs. 1 and 2 except that a prime is added in Fig. 9. According to Fig. 9, the helix 15' projects from the cylinder or drum 14' and forms a knife-edge at its periphery. The stylus carrier 9', engaged by the feed screw 7' carries a stylus member 11' which is integral with a pin 12' and axially movable relative to the carrier 9'. A spring biases the pin 12' against the surface of drum 14' and holds the point of stylus 11' normally away from the record sheet 6'. As the carrier 9' travels in the direction of the arrow A4, pin 12' will engage the projecting helix 15' at a point determined by the rotary adjustment of cylinder 14', and the helix will then force the pin toward the carrier 9' so that the stylus 11' approaches and touches the sheet 6. The stylus produces a mark at the point of contact and then returns to its inoperative position. If an ink pen or pencil stylus is used, the mark is produced merely by mechanical contact between stylus and paper. If the stylus is permanently connected to a current source, its contact with or sufficient approach toward the paper may also be used to mark an electroresponsive sheet substantially as explained in the foregoing. It is further possible to place a typewriter ribbon between stylus and sheet in order to perform a mechanical marking operation.

Figure 10:
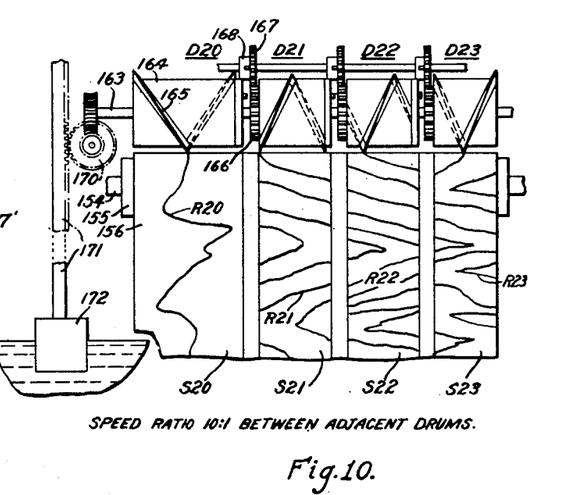

Referring to Fig. 10, the multiple recorder partly shown in this illustration has four devices for controlling the marking operation within respective areas of the strip chart. These devices are denoted by D20, D21, D22 and D23 respectively but are represented only by the appertaining helix drums. These drums, such as the one denoted by 164, are aligned on a shaft 163 and have each helix member as shown at 165. The helix drums of devices D21, D22 are revolvable about shaft 163 and are driven by gears such as those denoted by 166, 167 and 168 so that when drum 164 is driven by shaft 163, the other three drums will revolve at one tenth, one hundredth and one thousandth the speed of drum 164 in order to indicate units, tens, hundreds and thousands of a measured magnitude. Shaft 163 is shown to be driven through suitable transmissions 170 and 171 from a float 172 for recording changes in water level, as will be explained in a later place with reference to the corresponding chart illustrated in Fig. 21.

Recording apparatus according to the invention are especially favorable for the supervision of plants in which a large number of different magnitudes are to be recorded in correlation to one another. The invention facilitates taking such coordinated records by means of equipment of relatively small size and weight so that the equipment, if desired, may be designed as a portable or ambulatory unit. For instance, a recorder as shown in Figs. 1 and 2, or Fig. 3 may accommodate twelve charts, each about 20 mm. wide on a sheet of about 250 mm. width. The advancing speed of the sheet and the cycle period of the stylus can be chosen in accordance with the desiderate of each particular application.

Apparatus according to the invention are extremely versatile as to the various recordable phenomena and offer considerable advantages over the multi-pen recorders heretofore used for the supervision of plant operations not only toward better correlation between the different diagrams but also as regards the accuracy or readability of the individual chart records. These advantages will be understood from the following description of some of the methods of application of my recorders.

*Counting production or energy quantities*

It is often desirable to have a record of the production output of machines or other industrial equipment. In this respect, two data are usually of interest: (1) when was the machine running and when was it stopped? (2) what was the output or what was the energy consumption? Recorders have been built and used with from 12 to 20 recordings pens actuated by as many magnets for recording the "on" and "off" periods of a group of machines. The diagrams obtained with these known recorders are of the type exemplified by the diagram $a$ in Fig. 11. The illustrated diagram shows for a total period of one hour all interruptions in the operation of a machine under supervision but does not indicate whether the machine was running at reduced speed or under reduced load, or whether its output was insufficient. In this respect, a recorder according to the invention conveys more comprehensive information within a single diagram. Integrating counters of the type shown in Fig. 1 at $T1$ or $T12$ together with stepwise operated helix devices, such as device $D1$ in Figs. 1 and 2, are applicable for the recording purposes here in point. The strip chart diagrams produced by such recorders are exemplified by diagrams $b$ and $c$ in Fig. 11. Both diagrams are shown for the same number and moments of stoppage as the reference diagram $a$ but indicate different energy consumptions of the machine. The diagrams $b$ and $c$ are characteristic in that the record curve traverses consecutively the whole width of the diagram, advancing always in the same direction, and drops back to zero after a certain number of measuring units have been counted. Diagrams of this type show interruptions of the machine operation just as well as the diagram $a$, but they indicate also any slow-down or change in production output or energy consumption of the machine. For instance, diagram $b$ is drawn for normal production within the hour of observation, while diagram $c$ represents an operation in which the production was below standard part of the time. According to diagram $b$ the power consumed during the recording period (1 hour) was 24.2 kw. hr. With no stoppages, 40 kw. hr. would have been consumed. Hence the efficiency was 60.5%. According to diagram $c$, 16.2 kw. hr. were consumed corresponding to an efficiency of 41.5%.

Figure 12:
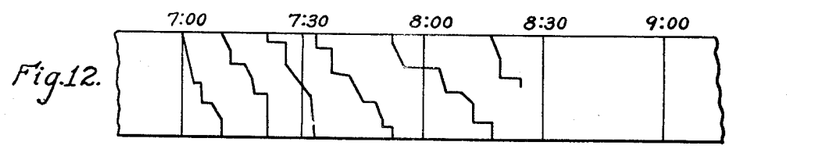

The number of impulses supplied by the impulse transmitters ($T1$, $T12$ in Fig. 1) to the step-by-step drives is preferably so chosen, or the gearing between the step drive and the helix drums so rated that the recorded diagram includes a convenient number of complete crossings of the strip chart within a suitable period of observation and under normal operating conditions of the machines or other plant units under supervision. For instance, for one shift (8 hours) of normal production, a number of 50 completed crossings on a strip chart of, for instance, 20 mm. can conveniently be counted on a 1000 mm. line. Hence, if a machine output is normally 10,000 pieces per day, the helix control device may be made to rotate the helix drum once for each 200 counted pieces; or if the machine output is only 2500 pieces per day, the control device may be chosen so as to obtain a full helix rotation for each 50 pieces or counting impulses. For less than 500 pieces per day in normal production, the helix can be made to rotate 360° for each 10 counting impulses, each impulse representing 2 mm. displacement of the recording mark across the width of the strip chart. With such arrangements, the recorded diagrams reveal at a glance the approximate output per given period by the number of crossings occurring within the period. Fig. 12 shows a typical strip chart corresponding to the last-mentioned example. The longitudinal axis of the chart indicates time, and each complete crossing denotes an output of 50 pieces so that the total output for any given period can easily be recognized. Irregularity of production and stoppages are also apparent from the diagram.

These principles of recorder operation can be applied to other integrating measuring operations such as the measuring and recording of gallons per time of fuel consumption, tons of steam per time, ampere hours, or other flow quantities.

*Measuring time*

In conventional multi-pen recorders, the advancing speed of the chart determines the accuracy of the time reading. Assuming that one can accurately distinguish advance distances of 1 mm., a chart advance of 60 mm. per hour affords a reading accuracy of 1 minute. That is, intervals of 1 minute can still be distinguished satisfactorily.

In cases where a higher accuracy of time reading is desired, a recorder according to the invention can readily be made to reduce the readable interval to a small fraction of one minute. To this end, one of the helices of the recorder is driven at constant speed, for instance, by a step-by-step drive, such as the one denoted by $D24$ and $T24$ in Fig. 15 and described below, so that it performs one rotation, for instance, within 120 seconds. Then, with a strip chart of 20 mm. width and a chart advance of 60 mm. per hour, the total travel of the stylus across the strip chart is 600 mm. per hour. Again, with a reading accuracy of 1 mm., one can now determine the duration of an operation to be recorded with an accuracy of six seconds. A time record of this kind is exemplified by the strip chart shown in Fig. 13. The chart shows that an operation under supervision started at time point $P1$ and ended at point $P2$. Since, in this example, each complete crossing denotes 120 seconds the interval of operation between $P1$ and $P2$ was eight minutes and fifty seconds. The second operating period, between points $P3$ and $P4$, lasted five minutes and twelve seconds; and the duration of the third period of operation is recorded, between points $P5$ and $P6$, as three minutes and six seconds.

*Recording differential or uniformity values*

Figure 11:
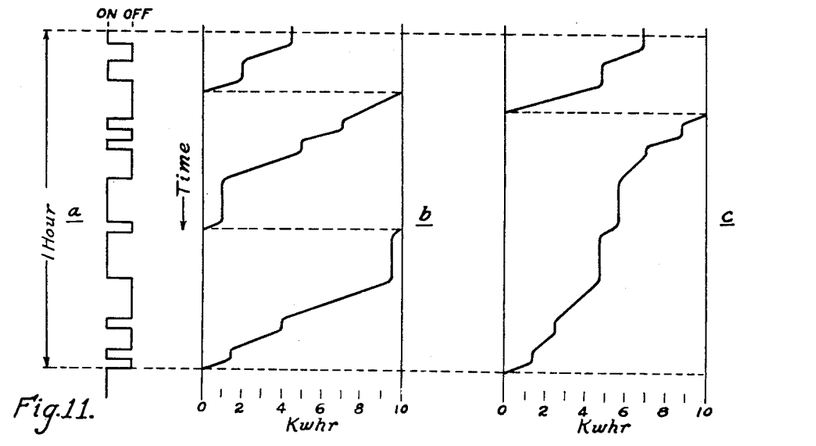
Figs. 11 through 14 exemplify different kinds of strip charts obtainable with recorders as shown in the preceding figures.
Figure 13:
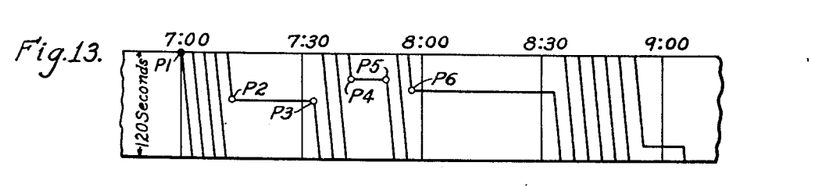
Figure 14:
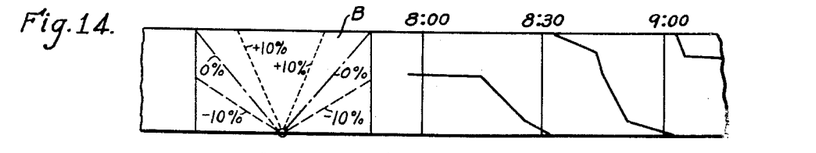

In diagrams of the integrating type as represented by diagrams $b$ and $c$ in Fig. 11, or by the diagram shown in Fig. 13, the angle of each crossing or any portion of such crossing remains substantially constant relative to the longitudinal (time) axis of the strip chart as long as the recorded production or flow magnitude changes uniformly. Consequently, the standard amount of uniform production or flow corresponds to a given angle, and any departure from standard requirements will manifest itself by an angular change in the course of the recorded curve. According to Fig. 14, a protractor-type transparent gauge B can be placed on the chart for determining the curve angle directly in terms of approximate percentile departure from the standard production value.

A more accurate method, especially suitable in cases where the production or energy magnitude to be moved is usually nearly uniform and varies only occasionally a few percent, consists in the use of a helix drum in conjunction with a reversible differential drive. Any control mechanism capable of rotating the helix drum in opposite directions in accordance with the direction and extent of the difference between two measuring magnitudes is applicable for this purpose. One of the available possibilities is illustrated in Fig. 15.

Figure 15:
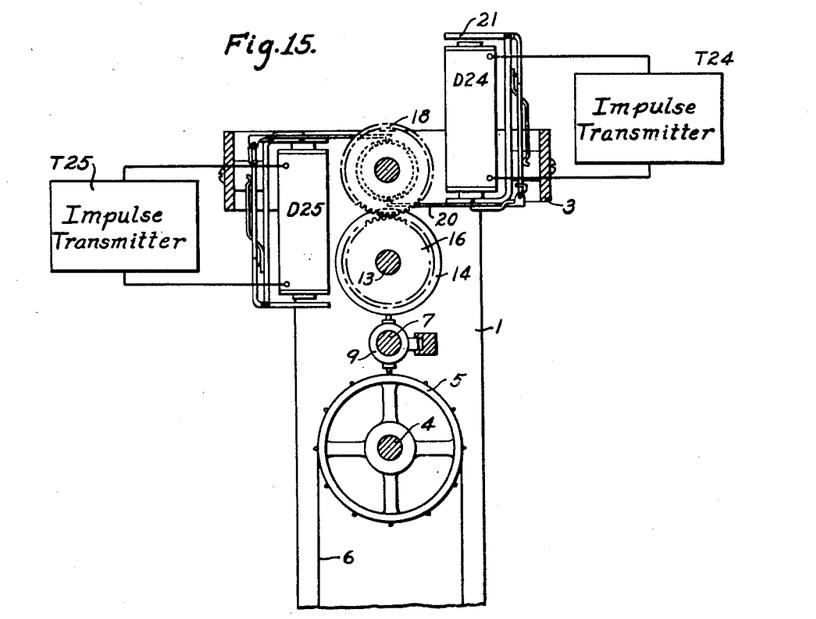
Fig. 15 represents a side elevation of a recording apparatus similar to that shown in Figs. 1 and 2 but especially designed for indicating differential magnitudes.

The recorder portion shown in Fig. 15 is substantially similar to that of Fig. 2 in particular as regards those parts which are denoted by the same reference numerals as in Fig. 2. The recorder of Fig. 15 is different only in having two control devices D24 and D25, each designed like any of drives D1 through D12 in Figs. 1 and 2, which act on the same ratchet gear 18' for driving the helix drum 14 in opposite directions. To this end the pawl tooth, which is controlled by the armature of device D24 and engages the teeth of ratchet gear, is shaped so that it slides ineffectively over the ratchet teeth when the armature of device D24 is attracted and pushes the ratchet gear clockwise when thereafter the armature is released. In contrast thereto, the corresponding pawl tooth of device D25 is shaped to pull the ratchet gear counterclockwise when the armature of device D25 is attracted but slides idle over the ratchet teeth when thereafter the armature is released. Each control device is actuated by a separate impulse transmitter T24 or T25. One of the transmitters T24 operates as a production counter like transmitter T1 in Fig. 1 or as an energy or flow counter like transmitter T12 in Fig. 1. The other transmitter T25 in Fig. 15 issues impulses in proportion to time.

Figure 16:
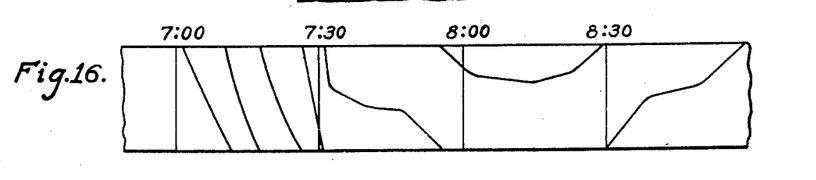
Figs. 16 and 17 exemplify further strip chart records of the kind obtainable with apparatus according to the invention.

If, for instance, the production to be supervised is supposed to be 10,000 pieces or measuring units in eight hours, the time-proportional transmitter T25 is adjusted to issue a corresponding number of impulses in equal intervals of time during the eight hour period. Hence 1250 time measuring impulses are issued per hour, or 21 impulses per minute. If the helix drum performs one full revolution for 200 impulses, this would amount to 2% of the normal production of the eight hour shift and would produce 50 crossings on the appertaining strip chart if the second control device remained inoperative during the entire shift period. However, since the second control device, in response to the actual output, is also working and acts in opposition to the time-proportional drive, a smaller number of crossings will appear on the chart. Thus, if the counted production stays 10% behind normal, only five crossings will appear on the chart during the eight hour period; that is, each crossing is completed in about 1.6 hours. If the counted production is 10% above schedule, the same number of five crossings will appear, but these crossings are slanted in the opposite direction. No crossing will appear if the production stays uniformly on the desired value. In summary, the slanting direction of any crossing marked on the chart indicates whether the production is higher or lower than normal, and the number of crossings indicates the number of pieces or other counting units gained or lost during any selected period of time. A typical diagram of this type is shown in Fig. 16. Changes in uniformity of production of only one or a few percent can easily be recognized on a strip chart of only 20 mm. width.

The same principle is applicable for various other differential measuring operations. For instance, for recording a supposedly constant speed of a machine, the speed is translated into a given number of impulses per revolution which are supplied to one of the differentially operating control devices. The other control device is provided with the normal number of impulses per length of time. The resulting diagram is also of the type shown in Fig. 16 and reveals speed variations of a few percent.

*Recording traffic*

Referring to Fig. 1, it will be understood that the electric marking circuit for any of the strip chart sections may include a relay contact, like the one denoted by S in Fig. 1, which permits interrupting the circuit between helix drum and sheet transport cylinder in response to the occurrence of a given condition, or which varies the stylus voltage by disconnecting the voltage source 22 (Fig. 1) and substituting it by a source 22' of low voltage, thereby changing the thickness of the recording mark produced by the stylus. This possibility can be taken advantage of for recording on a strip chart a magnitude in addition to those otherwise recordable in a single chart diagram. This will presently be elucidated by way of example.

Figure 17:
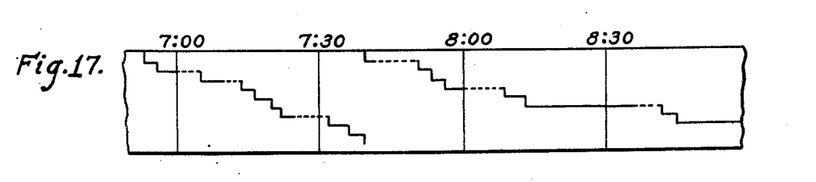

When using a recorder according to my invention, or one of its sections, for recording telephone traffic, a step-by-step drive (see T7 and D1 in Fig. 1) may be employed which rotates an appertaining helix drum (14 in Fig. 1) a given fraction, for instance, $^1/_{10}$ or $^1/_{20}$ of one revolution for each telephone call so that each complete travel of the diagram across the strip chart is equivalent to 10 or 20 recorded calls. The result is exemplified by the diagram shown in Fig. 17. When a call is completed, a relay, suitably connected with the telephone line or the appertaining selector and switching apparatus, disconnects the marking circuit or changes the stylus voltage as mentioned above. Hence, the periods during which the line is free are indicated by an interruption or change in the record diagram, as denoted in Fig. 17 by the dotted line portions. The strip chart thus obtained indicates the number of calls during any selected period, the duration of each call, the time when each call was made, and the time and duration of the "line free" periods.

*Recording positions and limits*

Figure 18:
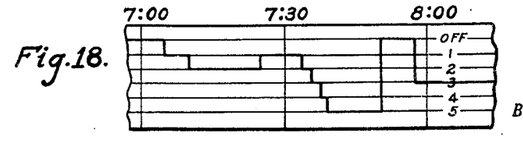
Figure 18A:
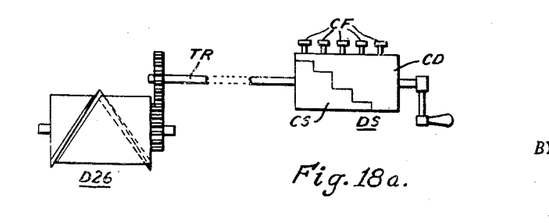

For recording the positions, for instance, of a multi-position switch, a helix drum with a step-by-step drive, as described in the foregoing, can be used for indicating the selected switch position by a corresponding position of the diagram point relative to the border or zero line of the appertaining strip chart. It is merely necessary to provide a synchrotie or other mechanical or electromagnetic connection between the switch mechanism and the helix drum so that the helix assumes a rotary position corresponding to the position of the switch. This is schematically illustrated in Fig. 18a, showing the helix drum of a stylus control device D26 connected by a transmission TR with the drum CD of a contactor DS whose contact segment CS cooperates with stationary contacts CF. A diagram of the type obtained in such a position recorder is shown in Fig. 18 for a switch having an "off" position and five operative positions.

Figures 19, 20:
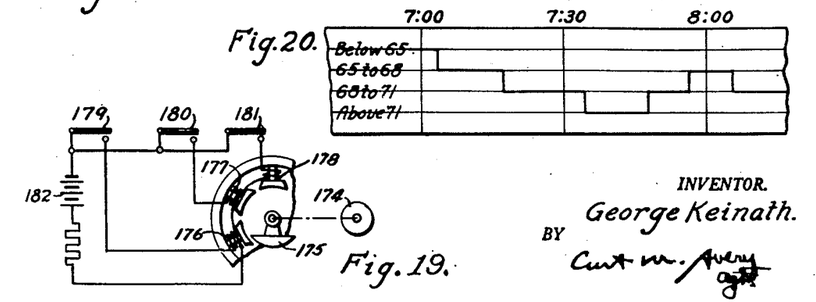
Fig. 19 is an explanatory circuit diagram of a control device applicable for recorders as shown in preceding figures.
Figs. 20 and 21 show further examples of obtainable chart records.

In heating or cooling plants the following method of recording temperature limits may be employed in connection with helix type recorders according to the invention in cases where a continuous temperature recording is not required. A limited number of temperature responsive relays, each set for a different temperature, are used for controlling the rotary position of the helix drum. This is exemplified schematically by the circuit diagram shown in Fig. 19. According to this figure, an armature 175 coacts with three field magnets 176, 177 and 178 each following having higher ampere turns than the preceding magnet. Each magnet is controlled by a thermostatic relay 179, 180, 181, respectively, and connected to a current source 182. Relay 179 is set to close its contact at a temperature of, for instance, 65° F.; and relays 180 and 181 close at 68° F. and 71° F. respectively. If the temperature to be recorded is below 65° F., none of the relays is closed so that the armature 175 is in the illustrated dropped off position. If the temperature is above 65° F. but below 68° F., only relay 179 is closed and the armature lifted up to magnet 176. If the temperature increases to a value between 65 and 68° F., the armature rotates another step toward magnet 177; and if the temperature exceeds 71° F., all three relays close so that the armature moves another step toward magnet 178. A subsequent decrease in temperature causes the armature to shift in the opposite direction of rotation due to the sequential opening of relays 181, 180 and 179. Armature 175 is connected by a suitable transmission with a helix drum 174 of the recorder. The diagram obtained in this manner is of the type shown in Fig. 20.

*Recording decimal values*

In recorders according to the invention, two or more helix drums can be coupled with one another by transmission or control devices so that they are controlled in dependence upon a single variable control magnitude but operate at different speeds in decimal relation to one another like the number wheels of a counting register.

This is illustrated in the above-described Fig. 10 and will be elucidated by the example of apparatus for recording the water level in reservoirs. Three items are often of interest for such recording purposes: (1) a representation of the approximate level movement between zero and maximum values, (2) a record of the small daily or hourly movements and (3) a record showing the quantity of contents or change of contents with high accuracy.

Figure 21:
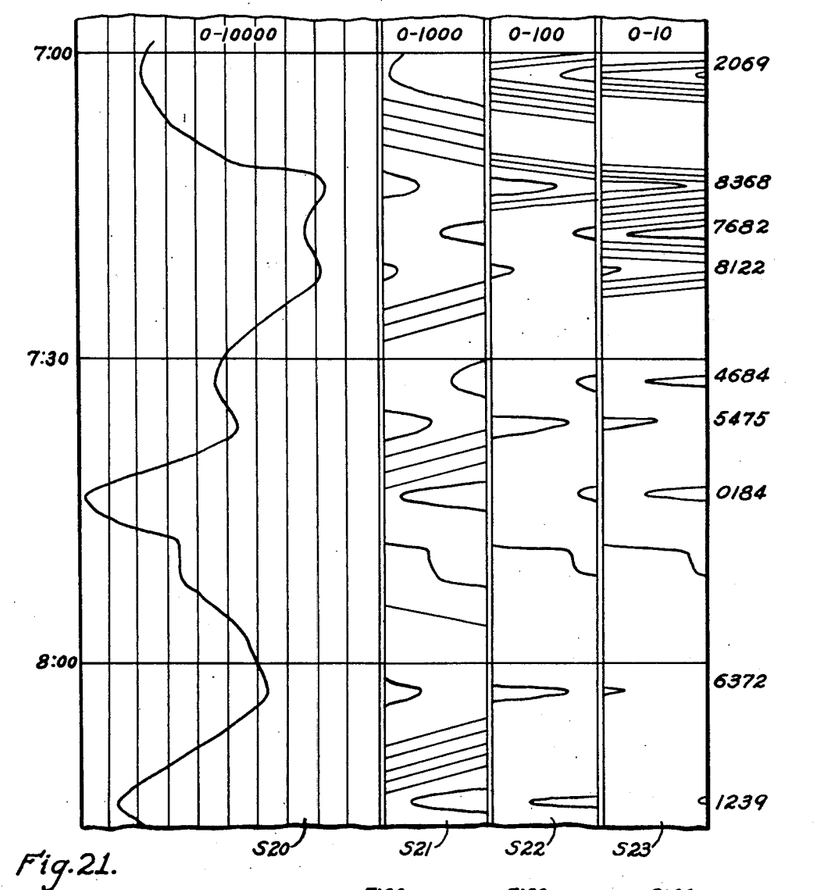

The conventional level recorders are usually float operated. They have a chart of considerable width (500 mm. or 20 inches wide) in order to afford fair reading accuracy. Compared therewith, a decimal hook-up between several helix drums of a recorder according to my invention does not only lead to smaller recorders but permits also an improved reading accuracy and a clear indication of minima and maxima. For instance, four helix drums, arranged side by side in the manner generally exemplified by Fig. 10, are driven by a float 172 or other measuring devices, so that the helices perform revolutions of reversible direction in accordance with the changes in water level. One helix drum (D20 in Fig. 10) is arranged for fastest rotation so that a full revolution of its helix corresponds to, for instance, 10 mm. change in level. The next helix drum (D21) is geared so as to revolve once for each 100 mm. changes in level. The third drum (D22) indicates 1000 mm. change by one full turn, and the fourth (D23) revolves once for a change of 10,000 mm. The diagrams thus obtainable are of the type exemplified by Fig. 21. The strip chart S20 of the diagram indicates the approximate total level changes between zero and 10,000 mm. Strip charts S21, S22 and S23 represent the thousands, hundreds and tens digits, respectively, of the same changes. During periods in which the changes of level occur in the same direction, the charts S21, S22 and S23 may show a series of crossings (only a few of such crossings are shown in Fig. 21). Each minimum and maximum is clearly marked and can be read off with high accuracy. The maxima and minima indicated in the diagram correspond to the millimeter values of level entered at the right-hand margin of the illustrated chart.

A decimal or digit principle of the above-elucidated type is also applicable for any other measuring purposes where extreme reading accuracy is required with a chart of rather limited width.

It will be understood from the foregoing description that recorders according to my invention are applicable for a large variety of recording purposes and that differently designed control and recording devices can be employed in connection with the different sections or helix drums of a multiple recorder. It will further be evident to those skilled in the art that several of the above-described features afford the intended advantages also if applied to drum type recorders or to recorders for a single strip chart, and that other modifications and changes than those described can be made within the gist of my invention and without departure from the scope of the essential features set forth in the claims appended hereto.

What I claim is:

1. Apparatus for recording a variable magnitude of a condition under observation, comprising means for accommodating and moving a record chart; a stylus member disposed for producing recording marks on the chart and being movable across the chart in a direction transverse to the motion of the chart; a helical member revolvable about its geometrical axis and having an axial extent correlated to the width of said chart in said direction so that different angular positions of said helical member correspond to different respective points along said width of the chart; a scanning member movable axially along said helical member and connected with said stylus member for controlling the latter to produce a mark on the chart when said scanning means pass through a point of engagement with said helical member; drive means for moving said stylus member and said scanning member cyclically and simultaneously in a proportion to each other; and condition-responsive control means in driving connection with said helical member for adjusting its position of revolution in dependence upon the magnitude to be recorded.

2. Apparatus for producing a record on a chart; comprising a backing member for accommodating the chart; a carrier displaceable along said backing member and provided with a stylus for producing a record on the chart and a member for controlling the recording operation of said stylus; a rotary member having its axis of rotation extending parallel to the path of motion of said carrier and being provided at its periphery with helical means for causing said control member to render said stylus operative when said control member, during the displacement of said carrier, is in registering position with said helical means; means for rotating said rotary member in accordance with the magnitude of a condition to be recorded in order to thereby displace said position in parallel to said path; drive means for displacing said carrier; and means for advancing the chart relative to said stylus and at an angle to said displacement.

3. Apparatus for producing multiple strip chart records on a recording sheet, comprising means for accommodating and longitudinally advancing the sheet; a plurality of serially aligned devices each having a helical member revolvable about its geometrical axis extending transversely of the sheet and means for controlling the rotary position of said helical member so as to thereby place a selected point of said helical member in a given reference position relative to the appertaining width portion of the sheet; marking means having a member movable transversely of the sheet for sequentially scanning the selected points of said plurality of helical members and having a stylus member and movable simultaneously with said scanning member and controlled by said scanning member so as to produce a recording mark on the sheet each time said scanning member passes through its position of registry with one of said points.

4. Apparatus for producing multiple strip chart records on a recording sheet, comprising means for accommodating and longitudinally advancing the sheet; a plurality of serially aligned devices each having a helical member revolvable about its geometrical axis and allotted to a portion of the width of the sheet; a plurality of control means for adjusting the rotary position of said helical members respectively so as to place a selected point of each helical member in a given reference position relative to the appertaining width portion of the sheet; marking means having a scanning member movable along said plurality of helical members for sequentially engaging said helical members at said selected points respectively and a stylus movable in synchronism with said scanning member and transversely of the sheet, said stylus being controlled by said scanning member to produce on the sheet a recording mark each time said scanning member engages said helical members respectively; and drive means for periodically moving said scanning member along said plurality of helical members while moving said stylus across the sheet.

5. A multiple strip chart recorder, comprising a backing member for accommodating the chart; a carrier displaceable along said backing member and provided with a stylus for producing a record on the chart and a member for controlling the recording operation of said stylus; a plurality of rotary members having a common axis of rotation extending in parallel to the path of motion of said carrier and being each provided at its periphery with helical means for causing said control member to render said stylus operative when said control member, during the displacement of said carrier, passes through registering positions with said respective helical means; a plurality of means for revolving said rotary members respectively in accordance with a corresponding plurality of magnitudes to be recorded in order to thereby displace said respective positions in parallel to said path; drive means for periodically displacing said carrier; and means for advancing the chart at an angle to said path.

6. A multiple strip chart recorder, comprising a revolvable conductive cylinder for accommodating and longitudinally advancing an electro-responsive chart; a carrier displaceable along said cylinder, provided with a stylus electrode for producing recording marks on the chart when energized, and having a contact member electrically connected with said stylus electrode; a plurality of insulating members revolvable about a common axis parallel to that of said cylinder and serially aligned along said cylinder, each of said members carrying a contact helix for engagement by said contact members; a plurality of means for revolving said insulating members so as to displace the point of contact engagement of said respective contact helices along the appertaining portion of said cylinder; drive means for periodically displacing said carrier so as to move it sequentially through the points of engagement of said contact helices; and electric means connected to said helices and said cylinders for energizing said stylus electrode when said contact member passes through the points of engagement with said helices.

7. Apparatus for recording a variable magnitude of a condition under observation, comprising means for moving a record chart at substantially constant speed; marking means disposed for producing a curve on the chart and including a single-turn helical member capable of successive full revolutions about its geometrical axis and having an axial extent correlated to the width of the chart transverse to the moving direction of the chart so that different positions of revolution of said helical member correspond to different singular points respectively across the width of the chart; a unidirectionally operating step-by-step drive having a driving member and having a stepwise revolvable gear engageable by said driving member to incrementally revolve in always the same direction when actuated by said driving member, said helical member being constrainedly connected with said gear and exclusively controlled by said gear to revolve in only one direction, an impulse transmitting counting device connected to said driving member for causing said gear to unidirectionally revolve said helical member a plurality of full turns for a given plurality of counts.

8. Apparatus for recording a variable magnitude of a condition under observation, comprising means for moving a record sheet; sheet marking means disposed for producing a plurality of curve records on the sheet and having a corresponding plurality of serially aligned helix members revolvable about a common geometrical axis, said helix members having an axial extent correlated to respective portions of the sheet so that different positions of revolution of each helix member corresponds to respectively different points on the appertaining sheet portion; condition-responsive drive means connected to one of said helix members for varying its position of revolution in accordance with the magnitude of the condition under observation, step-down transmission means interconnecting said helix members so that each following member revolves a progressively smaller fraction of the revolution of said one member so that the recorded curve records represent respective digits of a single recorded magnitude.

9. Recording apparatus, comprising means for accommodating and advancing a chart; chart-marking means for producing a recording mark on the chart at a marking point along the width of the chart transverse to the advancing direction of the chart, said marking means having a revolvable member shaped as a single full turn of a helix whose pitch is correlated to the width of the chart so that different positions of revolution of said helix member correspond to respectively different marking points; two separately controllable control devices having drive means connected with said helix member for revolving said helix member in opposite directions respectively; condition-responsive measuring means connected with one of said devices for controlling it to operate at a variable average speed corresponding to the variation of a measuring magnitude; and program means connected with said other device for controlling the latter to operate at an average speed in accordance with a predetermined program magnitude; whereby the record produced by said marking means is indicative of the departure of the measured magnitude from said program magnitude.

10. Apparatus for recording a plurality of variable quantities on a record sheet, comprising means for accommodating and longitudinally advancing the sheet, an assembly movable transversely of the advancing direction of the sheet and having electrically operable stylus means engageable with the sheet for marking the sheet and having contact means electrically connected with said stylus means for transmitting mark producing impulse to said stylus means, drive means for moving said assembly periodically across the sheet, a plurality of electrically conductive control members serially aligned in parallel relation to the travelling direction of said assembly and engageable by said contact means so as to be sequentially contacted by said contact means as said assembly travels across the sheet and electric circuit means in connection with said members and said contact means for providing said impulses as said contact means engages said respective members, whereby said stylus means is caused to produce on the sheet a plurality of parallel strip chart records each forming a curve representative of one of the quantities to be recorded.

11. Apparatus for recording a variable magnitude of a condition under observation, comprising means for moving a chart at a substantially constant rate of motion, means disposed for marking the chart and comprising a plurality of control devices correlated to different surface portions of the chart to make a plurality of curve records on said surface portions respectively, means for controlling one of said devices in response to said magnitude, a reducing transmission connecting said one device with the adjacent device and being a transmission ratio of 1:10 for operating the latter at one tenth rate of operation of said one device, and additional reducing transmissions of a transmission ratio of 1:10 connecting said latter device with the next following device and so forth, so that the plurality of records represent respective decimal digits of said magnitude.

12. Apparatus for producing multiple strip chart records on a recording sheet, comprising means for accommodating and advancing the sheet; marking means having a single stylus means movable transversely of the sheet and a plurality of devices serially aligned in a direction transversely of the sheet for controlling said stylus to produce a corresponding plurality of marks within respective width portions of the sheet; means for moving said stylus so that said stylus sequentially engages said devices as it completes one stroke of transversal travel; and control means for adjusting said devices so as to displace the respective points along the stylus travel at which said stylus engages said devices.

13. Apparatus for recording a variable magnitude of a condition under observation, comprising means for accommodating and moving a record chart; marking means disposed for producing a curve on the chart and including a single-turn helical member revolvable about its geometrical axis and having an axial extent correlated to the width of the chart transverse to the moving direction of the chart so that different positions of revolution of said helical member correspond to different singular points respective across the width of the chart; unidirectional drive means connected with said helical member for revolving it in a given direction, and condition-responsive control means connected to said drive means for operating the latter at a variable rate dependent upon a condition under observation whereby a curve is recorded which crosses the chart repeatedly during the period of several complete revolutions of said helical member so that the number of crossings is indicative of the integral value of said condition.

14. Apparatus for recording a plurality of variable quantities in strip chart means, comprising mechanism for longitudinally advancing the strip chart means, a single stylus disposed for electrically marking a corresponding plurality of records on said chart means and being movable at an angle to the chart advancing direction across substantially the entire width of said chart means, a single contact element mechanically connected with said stylus so as to be movable simultaneously and in a given positional relation relative to said stylus in order to complete a given cycle of movement during each complete crossing movement of said stylus, said contact element being electrically connected to said stylus for transmitting mark producing impulses thereto, drive means for moving said stylus and said contact element repeatedly over the respective paths of cyclical travel, a plurality of conductive members serially aligned along the path of travel of said contact element so as to be sequentially contacted by said contact element as said stylus travels once across the chart means, electric circuit means connected to said conductive members for causing them to transmit mark producing electric impulses to said contact element and stylus, and a plurality of control devices responsive to said respective quantities and connected with said respective members for controlling the transmission of said impulses as said contact element travels along said respective members, in order to cause said stylus to mark during a sequence of crossings a plurality of separate records on separate strip positions of the chart means that extend in parallel to each other along said advancing direction.

15. Apparatus for recording a variable magnitude of conditions under observation, comprising means for longitudinally moving an electro-responsive strip chart, means disposed for electrically producing curve records on the chart and including a carrier movable across the chart at a right angle to the moving direction of the chart, said carrier having a stylus electrode for marking the chart and a single contact element connected with said stylus electrode; a plurality of circuit members extending serially aligned along the path of said carrier so as to be sequentially contacted by said contact element along the path of travel of the latter in order to impart to said stylus a corresponding plurality of successive electric marking impulses; and a corresponding plurality of condition-responsive electric control circuits connected with said respective members for controlling the transmission of said impulses as said contact element travels.

GEORGE KEINATH.

REFERENCES CITED

The following references are of record in the file of this patent:

UNITED STATES PATENTS

| Number | Name | Date |
|---|---|---|
| 367,625 | Haynes | Aug. 2, 1887 |
| 1,278,964 | MacGill | Sept. 17, 1918 |
| 1,352,150 | Schmeider | Sept. 7, 1920 |
| 1,598,739 | Mettler | Sept. 7, 1926 |
| 1,641,199 | Rucka | Sept. 6, 1927 |
| 1,676,848 | Au | July 10, 1928 |
| 1,784,522 | Harrison | Dec. 9, 1930 |
| 1,825,551 | Serrell | Sept. 29, 1931 |
| 1,909,142 | Zworykin | May 16, 1933 |
| 1,933,356 | Warner | Oct. 31, 1933 |
| 1,967,072 | Young | July 17, 1934 |
| 2,141,974 | Finch | Dec. 27, 1938 |
| 2,151,936 | Pflugner | Mar. 28, 1939 |
| 2,232,589 | Chappell | Feb. 18, 1941 |

FOREIGN PATENTS

| Number | Country | Date |
|---|---|---|
| 310,582 | Great Britain | May 2, 1929 |